US008706873B2

(12) United States Patent
Kim

(10) Patent No.: US 8,706,873 B2
(45) Date of Patent: Apr. 22, 2014

(54) INFORMATION AND POINT SERVICE METHOD BY KEYWORD KEYSKIN

(75) Inventor: Gyeong-Ae Kim, Changwon (KR)

(73) Assignee: Kim Gyeong-Ae (SK)

( * ) Notice: Subject to any disclaimer, the term of this patent is extended or adjusted under 35 U.S.C. 154(b) by 0 days.

(21) Appl. No.: 13/576,017

(22) PCT Filed: Jan. 25, 2011

(86) PCT No.: PCT/KR2011/000515
§ 371 (c)(1),
(2), (4) Date: Jul. 30, 2012

(87) PCT Pub. No.: WO2011/096664
PCT Pub. Date: Aug. 11, 2011

(65) Prior Publication Data
US 2012/0324055 A1    Dec. 20, 2012

(30) Foreign Application Priority Data
Feb. 3, 2010    (KR) ......................... 10-2010-0009856

(51) Int. Cl.
| | | |
|---|---|---|
| G06F 15/173 | (2006.01) | |
| G06F 15/16 | (2006.01) | |
| G06Q 30/02 | (2012.01) | |
| G06F 3/00 | (2006.01) | |
| H04L 29/08 | (2006.01) | |

(52) U.S. Cl.
CPC ................ *H04L 67/22* (2013.01); *H04L 67/02* (2013.01); *G06Q 30/0207* (2013.01); *G06Q 30/0236* (2013.01)
USPC ............. 709/224; 709/228; 715/764; 705/1.1

(58) Field of Classification Search
CPC .... H04L 67/22; H04L 67/02; G06Q 30/0207; G06Q 30/0236
USPC ............. 709/224, 225, 228; 715/764; 705/1.1
See application file for complete search history.

(56) References Cited

U.S. PATENT DOCUMENTS

| | | | | |
|---|---|---|---|---|
| 5,633,622 | A  * | 5/1997 | Patterson | 340/309.8 |
| 6,544,295 | B1 * | 4/2003 | Bodnar | 709/219 |
| 7,054,637 | B2 * | 5/2006 | Weigand | 455/445 |
| 8,337,300 | B2 * | 12/2012 | Bowers et al. | 463/25 |

(Continued)

FOREIGN PATENT DOCUMENTS

| | | |
|---|---|---|
| KR | 10-2001-0016535 A | 3/2001 |
| KR | 10-2001-0054427 A | 7/2001 |
| KR | 10-0347704 B1 | 8/2002 |
| KR | 10-2008-0085669 A | 9/2008 |

OTHER PUBLICATIONS

International Search Report for PCT Application No. PCT/KR2011/000515 which corresponds to the above-referenced U.S. application.

*Primary Examiner* — Hieu Hoang
(74) *Attorney, Agent, or Firm* — Kim Gyeong-Ae

(57) ABSTRACT

This invention is about a Method of providing information on the Internet, like web page, and mileage-points by Keywords of Keyword-Keyskin. Keyword means newspaper, mobile phone, movie, or useful word(s), and Keyword-Keyskin means imprinted dust cover on the computer's keyboard. Specifically, Internet users can simplify the procedures of inputting commands to display web page information on their computer output device by shortcut commands (Hotkey) through computer connected to Internet network, and can easily earn mileage-points from using WWW surfing by one-time-Hotkey.

1 Claim, 5 Drawing Sheets

(56) References Cited

U.S. PATENT DOCUMENTS

| | | | |
|---|---|---|---|
| 2003/0011641 A1* | 1/2003 | Totman et al. | 345/810 |
| 2005/0131925 A1* | 6/2005 | Coker et al. | 707/100 |
| 2005/0177587 A1* | 8/2005 | Mukundan et al. | 707/100 |
| 2009/0064010 A1* | 3/2009 | Sojan et al. | 715/764 |

* cited by examiner

INFORMATION AND POINT SERVICE METHOD BY KEYWORD KEYSKIN

TECHNICAL FIELD

This invention is about a Method of providing information on the Internet and mileage-points to the people (hereafter 'End-user') who want to earn mileage-points from this invention by Keyword-Keyskin (hereafter 'KK'). The information means like web-page. Keyword means like newspaper, mobile phone, movie, or useful words in human's life (hereafter 'Keyword'). KK is an imprinted keyboard-cover, in other words dust-cover, with Keywords.

Specifically, End-user can simplify several procedures of inputting commands of 'keyboard and mouse' to display information of Service-page (hereafter 'Service-page'), like web-page(s) on the World Wide Web called 'WWW', on their computer's output device, like monitor, by keyboard shortcut commands (hereafter 'Hotkey'). End-user's computer is connected to the Internet. End-user's keyboard which is covered with KK is one of the basic inputting-device for computer. Hotkey-software is installed on End-user's computer that can detect Hotkey and handle the received signal from among the 'Keyword-Keyskin-Setting-Information-Providing Server-Computer' (hereafter 'KKSIP-SC'), 'Service-Brokerage Server-Computer' (hereafter 'SB-SC'), and 'Service-Page-Providing Server-Computer' (hereafter 'SPP-SC'). Service-page is similar to the web-pages on the all kinds of Internet sites. The Procedures include the steps to communicate with among End-user's computer, KKSIP-SC, SB-SC, and SPP-SC.

By this Method, using Internet for Service-page, the End-users can easily use Service-page by abridging and simplifying the Procedures to get not only Service-page but also their mileage-points, and they can easily be a good Prosumer (compound word of producer and consumer) of active on the Internet society.

BACKGROUND ART

Using of WWW surfing with wired network or wireless network is already well known, and computer and Internet were settled as essential part of human life such as political, economical, educational, and almost every field. For example, in the field of private financial transactions, business procedure by Internet and equipment such as home personal computer, PDA phone, notebook, mobile phone, etc were generalized these days, whereas the business was processed by direct visiting financial institutes in the past. Newspaper and education by Internet were already generalized too. However, according to recent media reports in Korea, it is actual circumstances that Korean people over the age of 40s are still alienated from computer and Internet, and many people cannot well utilize computer and Internet, they just use simple word processing, simple Internet searching or PC gaming, and the gap between the rich and the poor of valuable information also become bigger and bigger as time goes on. the general steps of reading today's newspaper on the web sites comprise of: moving mouse cursor to the web browser icon to open Internet portal site as peering, e.g. portal site means Google site, and then mouse button double-clicking to execute web browser S/W, and then entering a name of newspaper's company in the searching field on Service-page or moving mouse cursor to the linked list which contains newspaper's URLs, and then moving mouse cursor on the newspaper's link after searching result, and then mouse button clicking on the corresponding link and so on. Therefore, the users want easier and simpler method to solve this inconvenient problem.

On the other hand, those who want to use computer and Internet also want easier ways and means for Prosumer role at the same time. One of the ways and means is to give mileage-points to web surfers according to results of achievement (like mileage-points) of Internet shopping.

The ways and means to provide mileage-points are depend on each company. For example, users should repeat the procedures of joining membership on the each web shopping site providing mileage-points, and log in with inputting ID and password after viewing log-in Service-page for members at each web site.

For another example, there is so complicated business model that needs to be simplified and improved. The model is comprising: advertiser company which want to advertise their product through web sites, brokerage company such as advertising Agency providing mileage-points to their members of web site, members who want to earn mileage-points based on their WWW surfing or purchasing evaluation on the shopping mall, joining membership to brokerage company, providing Banner-ads which can be used on the web site to brokerage company by advertiser company, receiving the Banner-ads for brokerage company from the members, posting the Banner-ads on the member's web site like Blog, clicking mouse button on the Banner-ads by web site visitors and so on. Therefore, people want simpler ways and means than the steps as above.

Meanwhile, if Keywords are imprinted on the keyboard-cover, named Keyword-Keyskin (KK), its portability and substitutability are better than keyboard of computer, and KK is one of the composites in this invention.

DISCLOSURE

Technical Problem

This invention is to improve the inconvenient problem of the background art as above. End-users can easily surf on the Internet by Hotkey through keywords on KK's Key-pocket (refer to 120 of FIG. 1 each extruded area of KK corresponding to each key cap on keyboard. hereafter 'Key-pocket') and earn mileage-points at the same time.

Technical Solution

In this invention, the name of Keypad (hereafter 'Keypad') is alias of computer's keyboard, notebook's keyboard or PDA button-pad as main inputting peripheral devices of various computers. Keypad can be covered with KK. KK have Keywords or software's functions on each Key-pocket. The letters of Keywords or software's functions can be native or foreign language character, special character, and icon-image. KK is registered to utility model right in Korea as the number of 20-0226085-0000 on Mar. 23, 2001.

Also, Hotkey in this invention is desirable to be operated as 'Global System Hotkey', not only in the level of individual application. In order to solve the technical problem and operate mileage-points and provide information on the Internet at the same time, the steps of Method comprise: Step of that End-user's computer transmits a request signal to Keyword-Keyskin-Setting-Information-Providing Server-Computer for Keyword-Keyskin's setting information on Keypad through the Internet; step of that Keyword-Keyskin-Setting-Information-Providing Server-Computer receives the request signal, based on the received signal, Keyword-Keyskin-Setting-Information-Providing Server-Computer retrieves Keyword-Keyskin's setting information and Keyword-Keyskin-Setting-Information-Providing Server-Computer ID from the storage, and then Keyword-Keyskin-Setting-Information-Providing Server-Computer transmits the retrieved data of Keyword-Keyskin's setting information and Keyword-Keyskin-Setting-Information-Providing Server-Computer ID to End-user's computer; step of that End-user's computer receives the data of Keyword-Keyskin's setting information and Keyword-Keyskin-Setting-Information-Providing Server-Computer ID, and then End-user's computer saves the data on the storage; step of that End-user's computer detects a Hotkey by End-user through Keyword-Keyskin, and then End-user's computer retrieves the data of corresponding to Hotkey, End-user ID, and Keyword-Keyskin-Setting-Information-Providing Server-Computer ID from the storage, and then End-user's computer creates a request signal based on the retrieved data, and then End-user's computer transmits the request signal to Service-Brokerage Server-Computer; step of that Service-Brokerage Server-Computer receives the request signal, based on the received signal, Service-Brokerage Server-Computer retrieves End-user's mileage-points, Keyword-Keyskin-Setting-Information-Providing Server-Computer's achievements, Service-Brokerage Server-Computer ID, and the requested data of related Keyword from the storage, and then Service-Brokerage Server-Computer calculates and saves the data of End-user's mileage-points and Keyword-Keyskin-Setting-Information-Providing Server-Computer's achievements on the storage, and then Service-Brokerage Server-Computer creates another request signal based on the retrieved data, and then Service-Brokerage Server-Computer transmits the request signal to Service-Page-Providing Server-Computer; step of that Service-Page-Providing Server-Computer receives the request signal, based on the received signal, Service-Page-Providing Server-Computer retrieves End-user's mileage-points, Service-Brokerage Server-Computer's achievements, and Service-Page-Providing Server-Computer's Service-page related Keyword from the storage, and then Service-Page-Providing Server-Computer calculates and saves End-user's mileage-points and Service-Brokerage Server-Computer's achievements on the storage, and then Service-Page-Providing Server-Computer transmits Service-Page-Providing Server-Computer's Service-page to End-user's computer based on the retrieved data; step of that End-user's computer receives the data of Service-Page-Providing Server-Computer's Service-page, and then End-user's computer displays Service-Page-Providing Server-Computer's Service-page. This is the operating-Method of providing information and mileage-points by Keyword-Keyskin comprised of all above.

Advantageous Effects

According to this invention, thanks to improvement of preceding background art, End-users can very conveniently earn mileage-points as Prosumer and use Service-page by one-time-Hotkey as seeing KK's Keyword related various Internet services. This invention has effects of contributing to improvement of End-user's informatization level, narrowing of the gap between the rich and the poor of valuable information, and increasing Internet utilization of the handicapped person.

BEST MODE

Figure 1:
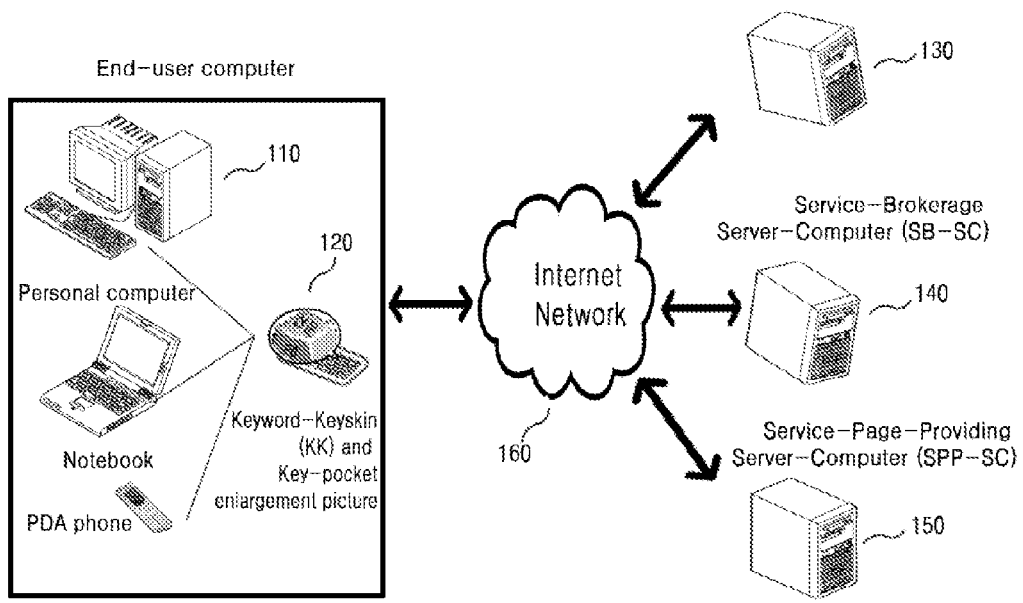
FIG. 1 shows hardware and network according to an implementation of this invention.

As shown in FIG. 1, this invention is composed of: 'End-user's computer' (110) such as personal computer, notebook, PDA phone, etc which are generally used by End-users, enlarged figure 120) of KK and 'Key-pocket' covered on Keypad which is main inputting device of End-user's computer, 'KKSIP-SC' (130) providing KK-setting information according to KK's type covered on Keypad of End-user's computer, 'SB-SC' (140) handling requested Keyword and End-users' mileage-points as their achievements, 'SPP-SC' (150) handling requested End-user's Keyword created by SB-SC, processing mileage-points of End-user and SC and KKSIP-SC according to their achievements, transmitting SPP-SC's Service-page to End-user's computer, 'Internet network' (160) connected End-user's computer, KKSIP-SC, SB-SC, SPP-SC and Internet. Also, End-user's computer and each Server-Computer embedded the software (hereafter 'Hotkey program') for service handling data (signal) according to this invention.

Hotkey program installed on End-user's computer can detect Hotkey generated by End-user through Keyword on KK's Key-pocket, and includes various functions, the functions of: setting KK's type, receiving KK-setting information from KKSIP-SC if KK's type is set for End-users, like for kids or middle school student or for learning foreign languages or MS-word software or MS-Excel and so on, so, there are so many kinds of KK's type, setting End-user ID, transmitting the requested data (signal) to SB-SC for corresponding. Hotkey program is independent from any OS (Operation System).

If comparing interrelation among KKSIP-SC, SPP-SC, and SB-SC with modern advertising world, it can be said that SPP-SC is corresponding to advertiser, SB-SC to advertising distributor, and KKSIP-SC to the advertising agency.

Also, as above, the achievements of each Server-Computer can be managed in cooperation with achievement-management software through their unique IDs: End-user ID, KKSIP-SC ID, SB-SC ID, and SPP-SC ID.

MODE FOR INVENTION

At first, terminologies used in this Patent application are as follows:
ID: It means Identification, distinguishable value like email ID, computer IP, social security number, i-PIN (Internet Personal Identification Number), and etc,
End-user's mileage-points: End-user's achievement according to this invention,
Server-Computer's achievement: Server-Computer's achievement according to this invention.
Detailed contents of this invention are described with attached drawings.
Although desirable implementations of this invention are explained with attached drawings and the details on this application form as below, this invention is not either restricted or limited to them. The same reference number suggested in each drawing represents the same member.
FIG. 1 is a drawing implemented hardware and network according to this invention.

As shown in FIG. 1, it is composed of: End-user's computer (110) such as personal computer, notebook, PDA phone, etc which are generally used by End-user, enlargement figure (120) of KK and 'Key-pocket' covered on Keypad which is basic inputting device of End-user's computer, 'KKSIP-SC' (130) of providing KK-setting information according to KK's type covered on Keypad of End-user's computer, 'SB-SC' (140) of handling requested data (signal) and End-user's mileage-points, KKSIP-SC's achievements, transmitting request signal to SPP-SC, 'SPP-SC' (150) of handling requested data (signal), End-user's Keyword, processing mileage-points of End-user's and SC's according to their achievements, transmitting SPP-SC's Service-page to End-user's computer, 'Internet network' (160) connected to End-user's computer, KKSIP-SC, SB-SC and SPP-SC and WWW. Also, End-user's computer and each Server-Computer embedded the software (hereafter 'Hotkey program') for service handling according to this invention.

Hotkey program installed on End-user's computer can detect Hotkey generated by End-user through Keyword on KK's Key-pocket, and Hotkey program include some functions, the functions of: setting KK's type, receiving KK-setting information from KKSIP-SC if KK's type is set for End-users, like for kids or middle school student or for learning foreign language or MS-word program or MS-Excel and so on, so, there are so many kinds of KK's type, setting End-user ID, transmitting the request signal to SB-SC for corresponding.

Hotkey program is independent from any OS.

Also, as above, the achievements of each Server-Computer can be managed in cooperation with achievement-management software through their unique IDs: End-user ID, KKSIP-SC ID, SB-SC ID, and SPP-SC ID.

Figure 2:
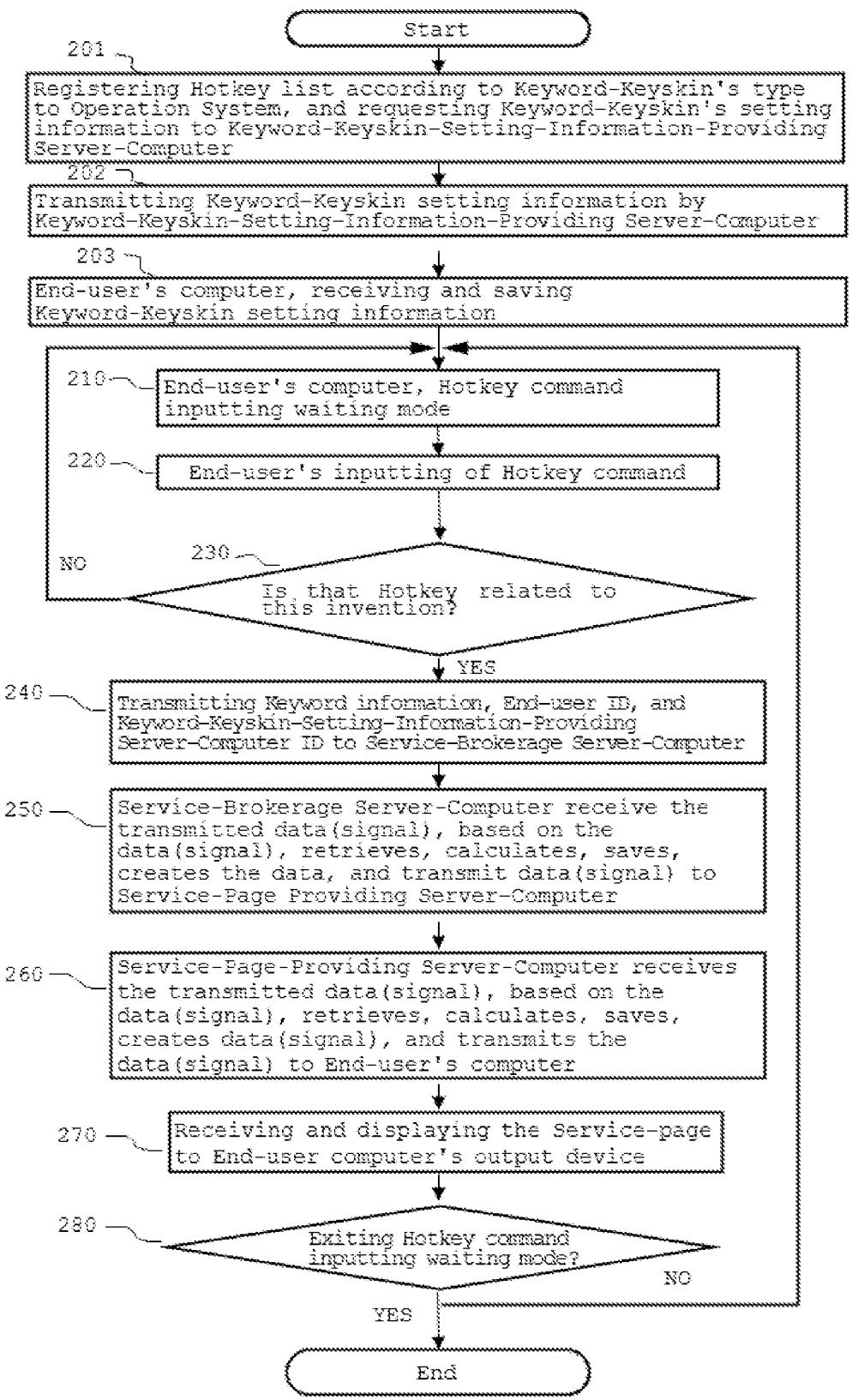
FIG. 2 shows flow chart for procedure-process according to an implementation of this invention.

FIG. 2 is a flow chart to show procedure-process according to an implementation of this invention.

According to FIG. 2, to setup environment of this invention, first of all, End-user's computer transmits a request signal to KKSIP-SC for Keyword-Keyskin's setting information on Keypad through the Internet (201). Then, KKSIP-SC returns the data of Keyword-Keyskin's setting information (202). And then End-user's computer saves the data on the storage (203). when End-user inputs a Hotkey through Keyword imprinted on KK's Key-pocket, Hotkey program which has Hotkey-detecting function should always be running in the background on OS of End-user computer, and Hotkey should be Global-System-hotkey not in only particular application program, it is normally used after registering to OS System Layer. Also, KK-setting information according to KK's type is referenced by End-user's Hotkey, KK-setting information is from KKSIP-SC and retrieved from End-user computer's storage. For example, when End-user presses corresponding to Hotkey of 'newspaper' to display today's newspaper on the WWW, End-user's web browser can directly move to Service-page of the particular newspaper homepage, End-user can also select particular WWW newspaper link as displayed WWW newspaper's linked lists on the screen or it can move to Service-page after watching advertisement. At this time, all such information is included in KK-setting information. Therefore, KK-setting information is important thing of this invention.

If End-user inputs a Hotkey (220) at Hotkey inputting waiting mode (210), End-user computer can detects Hotkey (230) by Hotkey program, and End-user computer decides whether it is Hotkey related to this invention (230) or not, because End-user's computer may have some other kind of hotkey program and other hotkeys. At that moment, if it is not of Hotkey related to this invention, the computer returns to Hotkey inputting waiting mode but if it is related to this invention, the computer moves to the next step. In order to avoid Hotkey conflicts, it is desirable to change to suspend-mode from Hotkey inputting waiting mode for a while, until current Hotkey processing is going on. After completed current Hotkey processing, it should return to Hotkey inputting waiting mode. The next step (240) is that End-user's computer transmits the signal including Keyword information from Hotkey and End-user ID and KKSIP-SC ID to SB-SC after retrieving data on recording media, such as storage.

The next step (250) is that SB-SC receives the signal from End-user's computer, based on the signal, SB-SC retrieves End-user's mileage-points and KKSIP-SC's achievements from storage, and SB-SC calculates End-user's mileage-points and KKSIP-SC's achievements, and saves calculated End-user's mileage-points and KKSIP-SC's achievements on storage, and SB-SC creates request signal included Keyword information and SB-SC ID and End-user ID, and SB-SC transmits the signal to SPP-SC.

The next step (260) is that SPP-SC receives the signal from SB-SC, based on the signal, SPP-SC retrieves End-user's mileage-points and SB-SC's achievements from storage, and SPP-SC calculates End-user's mileage-points and SB-SC's achievements, and SPP-SC saves calculated End-user's mileage-points and KKSIP-SC's achievements on storage, and SPP-SC transmits Service-page related Keyword End-user's computer. At this time, Service-page can be the logged in to End-user's web-account for convenience refer to End-user ID.

The next step (270) is that End-user's computer receives Service-page from SPP-SC and displays the Service-page on output device.

The next step (280) is that End-user's computer decides either to return to the waiting mode for Hotkey or to exit Hotkey program.

If End-user exit Hotkey program, End-user can't use this invention until restarting Hotkey program. It is possible to exit the waiting mode at Hotkey inputting waiting mode (210).

Also, KKSIP-SC and SB-SC are desirable to intermediate between End-users and SPP-SCs for using without joining membership individually, because End-user easily earn mileage-point and easily use Service-page. And transmitting signal is desirable to be encrypted for security.

As shown in flow chart of above procedure-process (FIG. 2), the purpose of this invention will be achieved as corresponding KK's Keyword on Keypad, and related Service-page are instantly displayed on output device of End-user's computer when End-users inputting Hotkey through Keyword imprinted on KK's Key-pocket, and End-user can easily earn mileage-points and use this invention at the same time.

Figure 3:
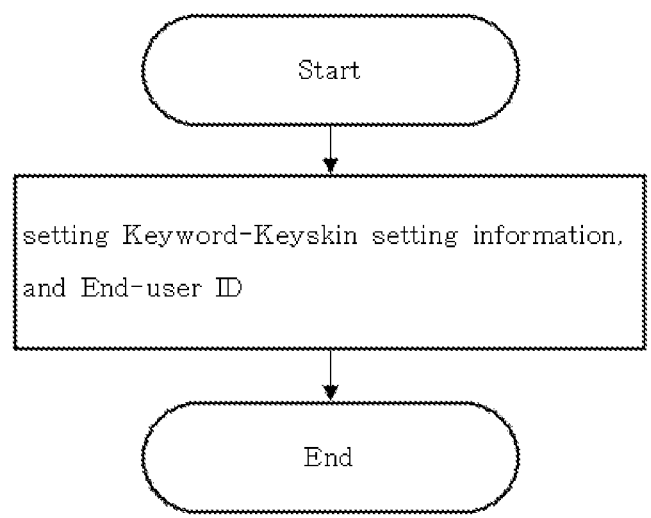
FIG. 3 shows flow chart for the setting-process of default value of KK's type and End-user ID to End-user's computer according to an implementation of this invention.

FIG. 3 is a flow chart showing the procedure of setting default data (values) to End-user's computer according to an implementation of this invention.

Refer to FIG. 3, the first time, KK should be covered on End-user's Keypad, and then Hotkey program should be installed End-user's computer, and KK's type and End-user ID are set and stored on the storage of End-user's computer.

The FIGs from 4a to 4f are drawings indicating that KK's type can be various, with enlarged FIGs of KK's Key-pocket according to an implementation of this invention.

Referring to the FIGs from 4a to 4f, specific implementations according to this invention with Korean-106-keyboard which have English QWERTY arrangement, KK, and Window-XP OS by MS (Microsoft in USA, hereafter 'MS'), and they are running on End-user's computer.

Keyword imprinted on KK are desirable not to be erased easily when End-users typing.

The FIGs from 4a to 4f are enlargement of Key-pocket corresponding to the location of English alphabet 'O' key on the Korean-106-keyboard.

Figure 4A:
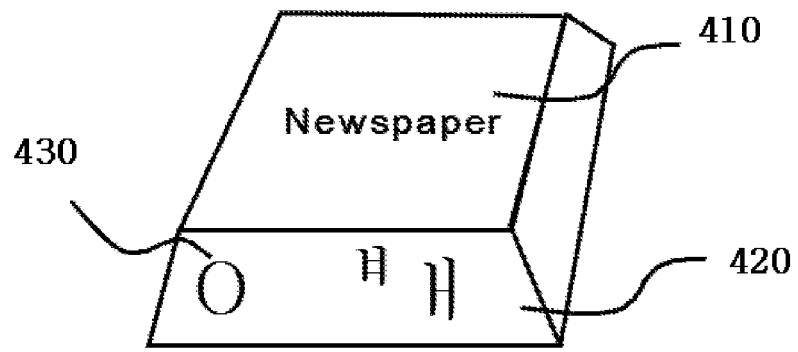
FIG. 4a-4f are enlargements of Keyword-Keyskin's Keypockets indicating that Keyword-Keyskin's type can be vary according to an implementation of this invention.

In FIG. 4a, Keyword is imprinted on the front view (410) of Key-pocket and characters of native language and 1st foreign language are imprinted on the side view (420). When End-users press KK's Keyword (410) with Extension-key to read Internet newspaper, whenever they want to read Internet newspaper while using computer, keycaps of the keyboard under KK are pressed and Service-page related to Keyword 'newspaper' will be displayed on End-user's output device at one-time-Hotkey.

The provided Service-page can be that of one particular newspaper on the WWW, or lists of linked newspapers on the WWW, or that of combination with personally stored Internet newspaper web site by End-user and Service-page.

Hotkey is desirable to be operated when pressing it together with combination of Extension-keys (Ctrl-key, Control key, Alt-key, Shift-key, Start-menu-key in MS Windows, command key in Mac OS, etc. hereafter 'Extension-key'), in order not to be conflicted with the functions of inputting characters in general keyboard. For example, when pressing Start-menu-key in MS windows (hereafter 'Start-menu-key') and Ctrl-key and English alphabet 'O' key together (normally press Extension-key first and then press 'O' key), Hotkey can be inputted.

If Extension-keys are combined, several Hotkey can be registered and managed by one key of keyboard.

Figure 4B:
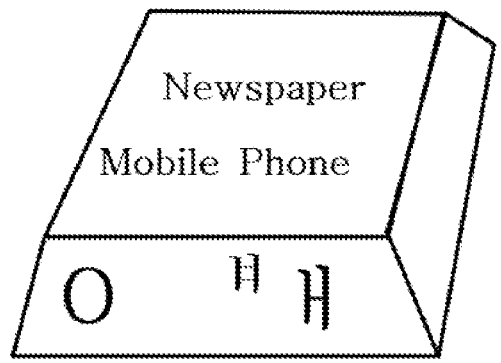
Figure 4C:
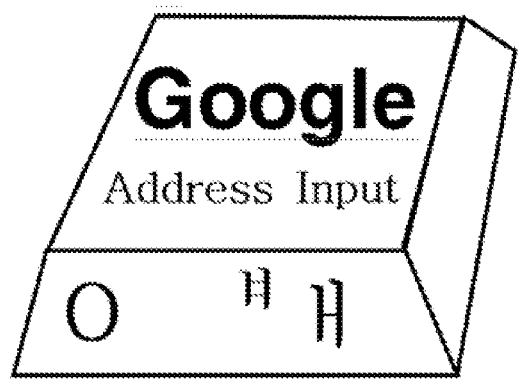

FIG. 4b is imprinted 2 Keywords 'newspaper' and 'mobile phone' on the front view of Key-pocket, and imprinted characters of native language and 1st foreign language on the side view. When pressing Keyword 'newspaper' together with Start-menu-key and Alt-key and 'O' key from End-user's computer, Hotkey can be operated so that Service-page related to corresponding Keyword will be displayed on End-user's output device. When pressing Keyword 'mobile phone' together with Start-menu-key and Ctrl-key and 'O' key from End-user's computer, Hotkey can be operated so that Service-page related corresponding Keyword will be displayed on End-user's output device. FIG. 4c is imprinted 2 Keywords 'Google' and 'address input' on the front view of Key-pocket and imprinted characters of native language and 1st foreign language on the side view. When pressing Keyword 'Google' together with Start-menu-key, Alt-key and 'O' key from End-user's computer, Hotkey can be operated so that Internet search Service-page related to corresponding Keyword will be displayed on End-user's output device. When pressing Keyword 'address input' together with Start-menu-key and Shift-key and 'O' key from End-user's computer, Hotkey can be operated so that End-user's address-string, like Office-address or Home-address, will be automatically entered at the keyboard cursor position, in other words, Caret. At that time, the address-string is that of retrieved data from the storage of End-user's computer. By doing so, they can be very convenient of working with computer of inputting any other strings what they want to type.

Figure 4D:
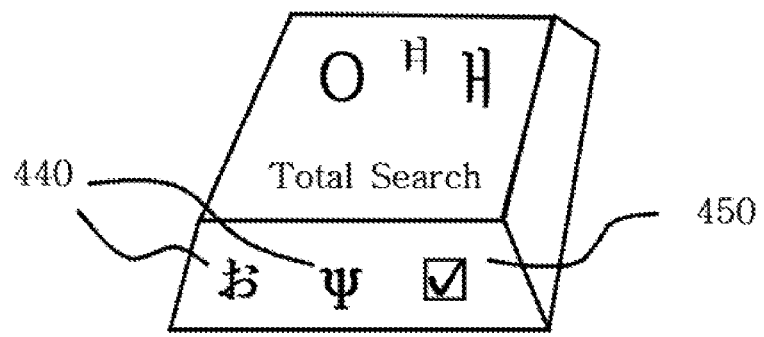

FIG. 4d is imprinted Keywords 'total search' and characters of native language and 1st foreign language on the front view, and imprinted characters and special characters of 2nd foreign language on the side view. When pressing Keyword 'total search' together with Start-menu-key and Alt-key and 'O' key from End-user's computer, Hotkey can be operated so that Service-page related to corresponding Keyword will be displayed. At that time, corresponding characters can be inputted through Key-pocket on the keyboard of 2nd foreign language and special characters supported by word processor program so that End-user can be very convenient of working with using computer.

For general searching information on the WWW, WWW.GOOGLE.COM site can be used. The procedure is that of: connecting to WWW.GOOGLE.COM, inputting search-words in the searching box through keyboard, confirming searched list, and selecting desirable information-link with mouse. But if suitable information were not presented, the same procedure will be repeated after moving to WWW.YAHOO.COM or other searching web sites. That is very inconvenient thing. This inconvenient problem can be solved as follows: making a Hotkey program and KK according to Keyword of 'total search', and granting Hotkey program some functions; Hotkey program can make the web browser have searched-results on the web browser's each tabs; and Hotkey program have checkboxes of searching web sites; and Hotkey program give End-user selecting function of checkboxes, and providing Hotkey program and KK to End-user, and using Hotkey program and KK by End-users. By so doing, End-users can easily search several web sites for their information at one-time-Hotkey. That is why providing Service-page by Keyword-Keyskin has many advantages.

Figure 4E:
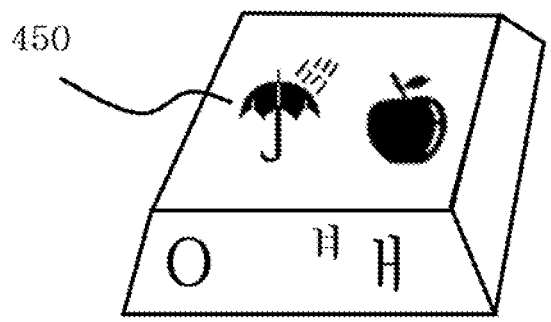

FIG. 4e is imprinted special characters on the front view such as '☂' character (special character symbolized raining over opened umbrella), '🍎' character (special character symbolized apple shape). When pressing the special character Keyword '☂' together with Start-menu-key and Alt-key and 'O' key from End-user's computer, Hotkey can be operated so that weather information Service-page associated to corresponding special character Keyword will be displayed. When pressing the special character Keyword '🍎' together with Start-menu-key and Ctrl-key and Shift-key and 'O' key, Hotkey can be operated so that fruit or agricultural product relate Service-page associated corresponding special character Keyword will be displayed.

Figure 4F:
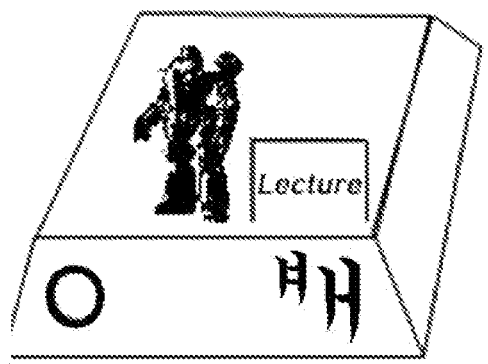

FIG. 4f is imprinted Keyword 'image Keyword' and 'lecture' provided by game called Starcraft (name of game produced by Blizzard Co. USA) on the front view. The game can be easily played through corresponding game-image (icon-image) from End-user's computer and when pressing Keyword 'lecture' together with Start-menu-key and Alt-key and 'O' key, Hotkey can be operated so that video-lecture Service-page related to corresponding Keyword of game-image will be displayed on End-user's output device immediately. Since even skilled person in the computer field spend much time and money in learning new specialized S/W, like AUTOCAD of Autodesk Company or PHOTOSHOP of Adobe, the drawing in the figure shows that if KK is manufactured as composing with application program's Hotkey and Service-page Keyword which help easily using individual application program, utilization of KK can be increased.

This invention is also possible to be realized as combining at least more than two Server-Computers among KKSIP-SC, SB-SC and SPP-SC, which is thinkable by persons who have general knowledge in technology field including this invention to improve efficiency of Server-Computer operation. For example, it is within the range of claims of this invention that two Server-Computers of 'SC-SC and SPP-SC' and KKSIP-SC are presented after integrating SB-SC and SPP-SC. The service operation software according to this invention is not limited to the program by particular company, and also computer readable recording media includes all kinds of recording storage devices which can store data readable by computer system. For example of computer readable recording media, there are CD-ROM, magnetic tape, floppy disk, ROM, RAM, optical data storage system and so on, and it also includes the device realized as the form of carrier wave (i.e. transmission through network). And in computer readable recording media, computer readable code can be stored and executed in distributed network environment. As mentioned above, the desirable implementations of this invention are described and explained, but this invention is not limited to particular implementation described above and generally knowledge persons in the technical fields including this invention can implement it with modification without overstepping bound of the essentials claimed in this invention, and its modification will be within claims of this invention.

DESCRIPTION OF NUMBER

110: End-user computer
120: enlargement of Keyword-Keyskin and Key-pocket
130: Keyword-Keyskin-Setting Information Providing Server-Computer (KKSIP-SC)
140: Service-Brokerage Server-Computer (SB-SC)
150: Service-Page-Providing Server-Computer (SPP-SC)
160: Internet network
410: Keyword imprinted on Keyword-Keyskin's Key-pocket
420: Native language character (Korean character)
430: 1st foreign language character (English character)
440: 2nd language character
450: Special character

The invention claimed is:

1. In the operating-Method of providing information and mileage-points by Keyword-Keyskin, comprising of the steps of:

Step of that End-user's computer transmits a request signal to Keyword-Keyskin-Setting-Information-Providing Server-Computer for Keyword-Keyskin's setting information on Keypad through the Internet;

step of that Keyword-Keyskin-Setting-Information-Providing Server-Computer receives the request signal, based on the received signal, Keyword-Keyskin-Setting-Information-Providing Server-Computer retrieves Keyword-Keyskin's setting information and Keyword-Keyskin-Setting-Information-Providing Server-Computer ID from the storage, and then Keyword-Keyskin-Setting-Information-Providing Server-Computer transmits the retrieved data of Keyword-Keyskin's setting information and Keyword-Keyskin-Setting-Information-Providing Server-Computer ID to End-user's computer;

step of that End-user's computer receives the data of Keyword-Keyskin's setting information and Keyword-Keyskin-Setting-Information-Providing Server-Computer ID, and then End-user's computer saves the data on the storage;

step of that End-user's computer detects a Hotkey by End-user through Keyword-Keyskin, and then End-user's computer retrieves the data of corresponding to Hotkey, End-user ID, and Keyword-Keyskin-Setting-Information-Providing Server-Computer ID from the storage, and then End-user's computer creates a request signal based on the retrieved data, and then End-user's computer transmits the request signal to Service-Brokerage Server-Computer;

step of that Service-Brokerage Server-Computer receives the request signal, based on the received signal, Service-Brokerage Server-Computer retrieves End-user's mileage-points, Keyword-Keyskin-Setting-Information-Providing Server-Computer's achievements, Service-Brokerage Server-Computer ID, and the requested data of related Keyword from the storage, and then Service-Brokerage Server-Computer calculates and saves the data of End-user's mileage-points and Keyword-Keyskin-Setting-Information-Providing Server-Computer's achievements on the storage, and then Service-Brokerage Server-Computer creates another request signal based on the retrieved data, and then Service-Brokerage Server-Computer transmits the request signal to Service-Page-Providing Server-Computer;

step of that Service-Page-Providing Server-Computer receives the request signal, based on the received signal, Service-Page-Providing Server-Computer retrieves End-user's mileage-points, Service-Brokerage Server-Computer's achievements, and Service-Page-Providing Server-Computer's Service-page related Keyword from the storage, and then Service-Page-Providing Server-Computer calculates and saves End-user's mileage-points and Service-Brokerage Server-Computer's achievements on the storage, and then Service-Page-Providing Server-Computer transmits Service-Page-Providing Server-Computer's Service-page to End-user's computer based on the retrieved data;

step of that End-user's computer receives the data of Service-Page-Providing Server-Computer's Service-page, and then End-user's computer displays Service-Page-Providing Server-Computer's Service-page;

This is the operating-Method of providing information and mileage-points by Keyword-Keyskin comprised of all above.

* * * * *